356-138 SR

3/3/87 XR 4,648,048

United States Patent [19]

Dorn et al.

[11] Patent Number: 4,648,048

[45] Date of Patent: Mar. 3, 1987

[54] APPARATUS FOR DETERMINING AND EVALUATING COLOR MEASUREMENT STRIPS ON A PRINTED SHEET

[75] Inventors: Alfred Dorn, Rodgan; Peter Schramm, Kahl/Main; Siegfried Schuhmann, Offenbach am Main, all of Fed. Rep. of Germany; Oded Zingher, Alzenau, Israel

[73] Assignee: M.A.N.-Roland Druckmaschinen Aktiengesellschaft, Fed. Rep. of Germany

[21] Appl. No.: 574,875

[22] Filed: Jan. 30, 1984

[30] Foreign Application Priority Data

Jan. 29, 1983 [EP] European Pat. Off. ........... 83100841

[51] Int. Cl.⁴ ..................... G01B 11/14; G06F 15/626

[52] U.S. Cl. ..................................... 364/526; 250/561; 356/138; 356/375; 364/520

[58] Field of Search ........ 364/170, 171, 513, 518–520, 364/526, 552, 564; 356/138, 141, 373, 375; 250/557, 561; 382/44, 45, 48

[56] References Cited

U.S. PATENT DOCUMENTS

| | | | |
|---|---|---|---|
| 3,995,958 | 12/1976 | Pfahl et al. | 356/173 |
| 4,200,932 | 4/1980 | Schramm et al. | 364/519 |
| 4,370,721 | 1/1983 | Berenberg et al. | 364/170 X |
| 4,414,635 | 11/1983 | Gast et al. | 364/526 |
| 4,428,287 | 1/1984 | Greiner | 364/519 X |
| 4,435,837 | 3/1984 | Abernathy | 364/564 X |
| 4,499,383 | 2/1985 | Loose | 250/561 |
| 4,505,589 | 3/1985 | Ott et al. | 364/526 X |
| 4,518,862 | 5/1985 | Dorn | 356/375 X |
| 4,528,630 | 7/1985 | Sargent | 250/557 X |

FOREIGN PATENT DOCUMENTS

| | | |
|---|---|---|
| 2023467 | 11/1971 | Fed. Rep. of Germany . |
| 2202087 | 9/1972 | Fed. Rep. of Germany . |
| 2913410 | 10/1980 | Fed. Rep. of Germany . |

OTHER PUBLICATIONS

Brochure "CCD Analog VLSI—Technology of the 80's", 1981, pp. 5-6, 86-89, 126.30-126.32, published by Electronic 2000 Vertriebs GmbH Newmarkter Str. 71 presented at Laser exposition in Munich.

*Primary Examiner*—Errol A. Krass
*Assistant Examiner*—Kevin J. Teska
*Attorney, Agent, or Firm*—Leydig, Voit & Mayer

[57] ABSTRACT

An apparatus to obtain ink density data by scanning color measurement strips on a printed sheet has a densitometer mounted on a digitally-driven X,Y positioning mechanism, an optical sensor for detecting the position and orientation of the sheet with respect to the X,Y positioning mechanism, and a numerical computer for transforming the sheet coordinates of the color measurement strips to the X,Y coordinates of the X,Y positioning mechanism. Thus, the numerical computer can automatically position the densitometer to scan the color measurement strips. In a first embodiment, optical sensor arrays determine the position and orientation of the test sheet with respect to the X,Y positioning mechanism. In a second embodiment, the densitometer itself scans the edge portions of the test sheet to determine the position and orientation of the test sheet. The operator has the option of using sheet coordinates of the color measurement strips obtained from non-volatile storage, from a recording medium such as magnetic tape or disk, from direct operator entry from a keyboard, or from the sighting of the measurement strips on the test sheet arbitrarily positioned and oriented with respect to the X,Y positioning mechanism.

3 Claims, 13 Drawing Figures

APPARATUS FOR DETERMINING AND EVALUATING COLOR MEASUREMENT STRIPS ON A PRINTED SHEET

BACKGROUND OF THE INVENTION

This invention relates to an apparatus comprising an optical densitometer for determining and evaluating color measurement strips on a printed test sheet lying on a coordinate measuring table.

In the state of the art of printing machines, the densities of ink or color balance in printing machines are established by numerous ink-dosing elements arranged across the width of the printing machine and the ink-dosing elements are individually adjustable by remote control adjusting devices. In order to generate the control signals for the automatic ink-dosing elements, color measurement strips are printed on production sheets and some of these production sheets are selected as test sheets. After printing, the test sheets are conveyed to a densitometer table having an optical densitometer mounted for traversing or scanning the color measurement strips. In state of the art systems, the signals from the optical densitometer are automatically processed to compare the measured ink densities to desired ink densities in order to remotely control the ink-dosing elements in the printing machine. See, for example, Schramm et al. U.S. Pat. No. 4,200,932 issued Apr. 29, 1980 for which a reexamination certificate issued Apr. 26, 1983. The major printing machine manufacturers sell systems similar to the system disclosed in Schramm et al. 4,200,932.

Although the ink feed controls for the printing machine are generally automatic, the selection of test sheets and the scanning of the color measurement strips on the test sheets is a repititious process. A laborious and sometimes error generating step in the process has been the proper alignment of the test sheets on the densitometer table.

The alignment problem is particularly serious in view of the various types of paper ranging from thin printing paper to thick cards. Card orders require the maximum utilization of the area available for printing and thus for card orders the positions and total area available for color measurement strips are highly restricted. In practice, the color measurement strips are always at different places for different printing orders or jobs depending upon the orientation of the printed text on the sheets. The scanning process is also adversely affected by curling of the test sheets so that the test sheets do not lie exactly flat on the coordinate measuring table, and by variation in illumination across the sheet.

SUMMARY OF THE INVENTION

A general object of the invention is to reduce the time, labor and error associated with the setting up and maintenance of ink density adjustments for a printing operation.

A specific object is to eliminate the need for precisely aligning test sheets on a densitometer table for the scanning of color measurement strips.

Another specific object is to facilitate the determination of the actual coordinates of color measurement strips on a test sheet.

Still another object of the invention is to compensate for shrinkage of the test sheets.

Briefly, in accordance with one aspect of the invention, the actual position of the color measurement strips on the test sheet with respect to the test sheet is detected and deposited in memory; the position and orientation of the test sheet on the densitometer table is determined by optically scanning the test sheet and is stored in memory; the coordinate values of the test strips with respect to the test sheet are transformed to coordinates with respect to the densitometer table in accordance with the stored position and orientation of the test sheet on the densitometer table; and the densitometer of the densitometer table automatically scans the test strips in response to the transformed coordinate values with respect to the densitometer table. In accordance with a related aspect of the invention, the actual coordinates of the color measurement strips on the test sheet are determined by sighting the coordinates of the color measurement strips with respect to the densitometer table and inverse transforming them to coordinates with respect to the test sheet. The actual coordinates of the color measurement strips with respect to the sheet are alternatively received directly from a keyboard or from a non-volatile recording medium such as magnetic tape.

In accordance with a first specific embodiment of the invention, the position and orientation of the test sheet on the densitometer table is detected by optical sensor arrays embedded in the densitometer table and partially covered by edge portions of the test sheet. In accordance with a second specific embodiment of the invention, the densitometer itself senses the position and orientation of the test sheet. Since the densitometer detects reflected light rather than the shading by an edge portion of the sheet, the densitometer accurately determines the position and orientation of a test sheet having edges that are not flat but are slightly kinked or corrugated. The densitometer can sense sheet position even if the ambient illumination is diffuse light incident at an angle. In this second specific embodiment, the sheet support is provided with a dark surface providing high contrast with respect to the edge portions of the test sheet.

The densitometer can also read marks printed on the test sheet which is useful for detecting shrinkage of the test sheet. A shrinkage factor is calculated as the distance between two marks on the printed sheet divided by the known distance between the corresponding marks on the associate printing plate. The shrinkage factor is used as an adjustment factor upon the sheet coordinates to compensate for sheet shrinkage.

BRIEF DESCRIPTION OF THE DRAWINGS

Other objects and advantages of the present invention will become apparent upon reading the following detailed description and upon reference to the drawings in which:

FIG. 12 is a flowchart of a subroutine called by the executive program of FIG. 11 to sense the sheet edges; and FIG. 13 is a flowchart of a subroutine called by the executive program of FIG. 11 to receive test strip coordinates from the operator and to obtain ink density values by scanning the test strips.

Figure 1:
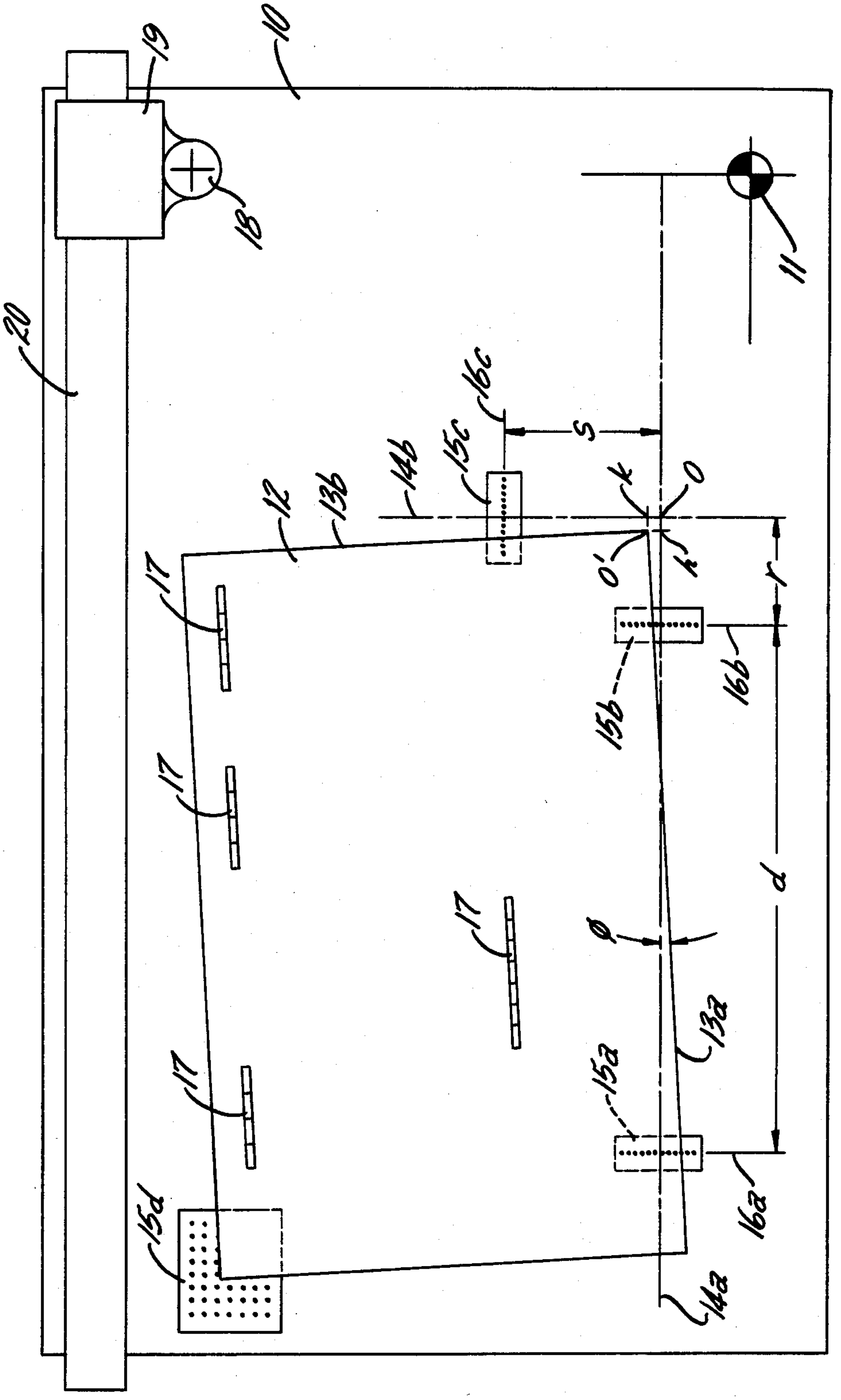
FIG. 1 is a diagrammatic plan view of a first embodiment of the invention wherein a densitometer on an X-Y positioning mechanism is driven to scan a plurality of color measurement strips on a printed sheet having an arbitrary orientation on a coordinate measuring table.

While the invention is susceptible to various modifications and alternative forms, specific embodiments thereof have been shown by way of example in the drawings and will herein be described in detail. It should be understood, however, that the intention is not to limit the invention to the particular forms disclosed, but, on the contrary, the intention is to cover all modifications, equivalents, and alternatives falling within the spirit and scope of the invention as defined by the appended claims.

DESCRIPTION OF THE PREFERRED EMBODIMENTS

Turning now to the drawings, there is shown in FIG. 1 a sheet support 10 comprising the bed or coordinate measuring table of an X-Y plotter or positioning mechanism. The support 10 has a reference point 11 from which all coordinates on the support 10 are referenced, for example during an initial calibration procedure. The support 10 receives a sheet 12 having a front edge 13*a* and a side edge 13*b* which are selected as reference edges and define an origin O' for coordinates (x',y') referenced to the sheet. In general, the reference edges 13*a*, 13*b* will not precisely line up with fixed coordinate axes 14*a*, 14*b* referenced to the support 10 and defining an origin O for the coordinates (x,y) referenced to the support.

In accordance with an important aspect of the invention, ink density measurements are performed at predetermined coordinates (x',y') referenced to the sheet 12 by applying a coordinate transformation to the predetermined coordinates to generate coordinates (x,y) referenced to the support 10. The coordinate transformation is automatically determined by sensing the positions of the sheet edges 13*a*, 13*b*.

In order to detect the deviation of the sheet edges 13*a* and 13*b* from the fixed coordinate axes 14*a*, 14*b*, a first embodiment of the invention uses charge coupled device (CCD) sensor arrays, and a second embodiment of the invention uses the optical densitometer 18. In FIG. 1, a pair of CCD image sensors 15*a*, 15*b* or "line scan cameras" are spaced apart by a distance d and positioned along the horizontal coordinate axis 14*a* and a third CCD image sensor 15*c* is positioned along the vertical coordinate axis 14*b*. The image sensors 15*a*, 15*b*, 15*c* each have a linear array of light sensing or image points aligned along axes 16*a*, 16*b*, 16*c* respectively. Light received at these image points is converted to electrical signals at a plurality of image sensing elements or cells (not shown) inside the image sensors 15*a*, 15*b*, 15*c*. The image sensors 15*a*, 15*b*, 15*c* are recessed in the sheet support 10 and, as shown in FIG. 1, they are partially covered by the sheet 12 so that a segment of each linear array of light sensing elements in the sensors 15*a*, 15*b*, 15*c* is covered while another segment is exposed to ambient light. Hence, the point of intersection of the covering edge portion of the sheet with the axis of each array is correlated with a maximum gradient along the respective axis in the light intensity received by the respective light sensing element. In other words, the position of the covering edge portion will fall between two adjacent light sensing elements. The light sensing element being exposed to the ambient light will receive much more light than the light sensing element being covered by the edge portion of the sheet. Hence, the difference or gradient in light received by the exposed element with respect to the light received by the adjacent covered element will be a maximum, compared with the gradients or differences for other adjacent pairs of light sensing elements.

In order to determine the coordinates of the points of intersection of the covering edge 13 with the axes 16*a*, 16*b*, 16*c* of the image sensors 15*a*, 15*b*, 15*c* appropriate electronic circuitry, to be described further in detail, scans the light sensing elements and determines the coordinates by processing the electrical signals. The variable ones of these coordinates define respective offset values EA, EB, EC from which the position and orientation of the sheet 12 on the support are calculated to perform coordinate transformations.

The sheet 10 has a plurality of ink density or color test strips 17 printed thereon in order to record the ink density and color balance of a printing operation. Since the test strips 17 are printed on production sheets as well as test sheets, it is desirable that the test strips be physically small and narrow. Hence, it is desirable for the mechanism which reads the test strips 17 to know the precise position and orientation of the test strips with respect to the support 10. The actual reading of the test strips 17 is done by an optical densitometer 18 mounted on an X-Y positioning head 19 which travels across a cross bar 20. Since the cross bar 20 moves longitudinally, the optical densitometer 18 can move to any desired coordinates on the support 10.

Persons skilled in the art will recognize that the sheet support 10, head 19 and cross bar 20 are components of commercially available digitally-driven X-Y flat-bed plotters. The plotter is interfaced to a numerical computer by known methods so that the numerical computer will drive the cross head 19 to any desired coordinates as specified by a procedure executed by the numerical computer. The procedure specifies coordinates referenced to the origin O in FIG. 1.

In mathematical terms, the coordinates (x,y) referenced to the plotter origin O are related to the coordinates (x',y') referenced to the sheet origin O' by the transformation equations $$x = x' \cos\phi - y' \sin\phi - h$$

$$y = x' \sin\phi + y' \cos\phi + k$$

where (h,k) are the plotter coordinates of the paper origin O' referenced to the plotter origin O, and where the angle $\phi$ is the angle of the x' axis (designated by reference numeral 13*a*) with respect to the x axis (designated by reference numeral 14*a*).

The transformation constants $\phi$ and (h,k) are determined from the offsets EA, EB, and EC of the paper edges 13*a*, 13*b*, along the axes 16*a*, 16*b*, 16*c* of the respective sensors 15*a*, 15*b*, 15*c*. The transformation constants $\phi$ and (h,k) as well as the offsets EA, EB, and EC are signed scalars. For the position $\phi$ and orientation (h,k) of the sheet 12 with respect to the support 10 shown in FIG. 1, the angle $\phi$ is positive, h is negative, k is positive, EA is negative, EB is positive, and EC is negative. The tangent of the angle $\phi$ is easily calculated from the offsets EA and EC according to $$\phi = \arctan((EB - EA)/d)$$

where d is the distance of separation between the sensors 15*a* and 15*b*. By inspection of FIG. 1, the offsets EB and EC are easily expressed as linear combinations of h and k according to $$EB = k - (r + h)\tan\phi$$

$$EC = h - (s - k)\tan\phi$$

where r is the distance of the axis 16*b* of the sensor 15*b* from the plotter origin O and s is the distance of the axis 16*c* of the sensor 15*c* from the plotter origin O. These two simultaneous equations in the two unknowns (h,k) may be solved for the unknowns (h,k) according to $$h = (EC + (s - EB)\tan\phi - r\tan^2\phi)/(1 + \tan^2\phi)$$

$$k = (EB + (r + EC)\tan\phi + s\tan^2\phi)/(1 + \tan^2\phi)$$

The transformation constants, which are fixed for any specific position and orientation of the sheet 12 on the support 10, have now been independently expressed in terms of the sensed offset values.

The above-described measurement operations can be simplified if a two-dimensional matrix sensor 15*d* is used instead of the linear image sensors 15*a*, 15*b*, and 15*c*. By using a high resolution matrix sensor having 500×500 pick-up elements, the coordinates of a corner of the sheet as well as the intersecting edges can be sensed directly. The precise size, position and orientation of the sheet may be determined most accurately if a matrix sensor 15*d* is disposed at each of the four corners of the sheet 12.

Figure 2:
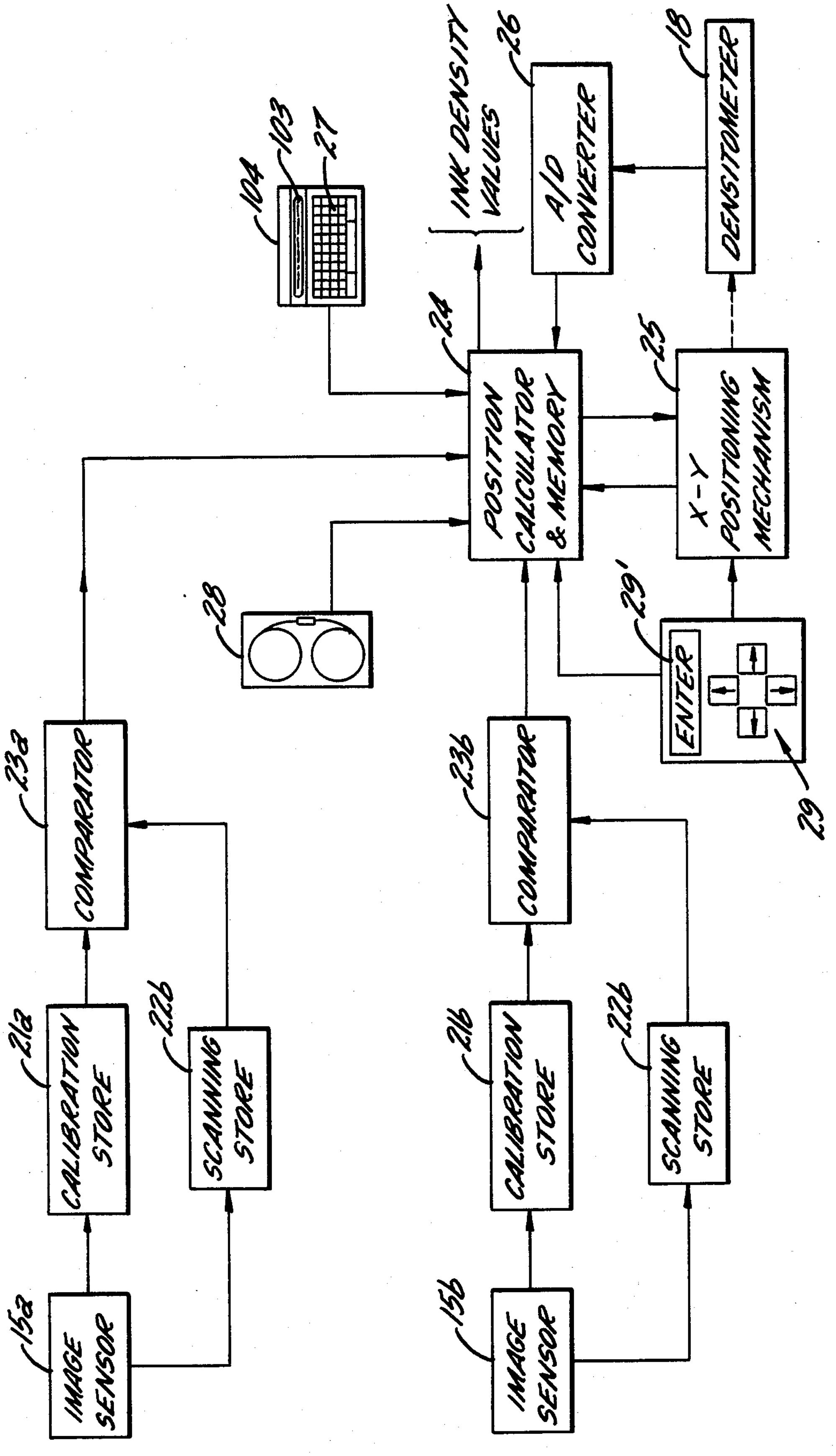
FIG. 2 is a block schematic diagram of the first embodiment of the invention shown in FIG. 1.

Shown in FIG. 2 is a block diagram for the edge-detecting electronics which processes multiplexed electronic signals from the image sensors in order to determine the coordinates of the intersection of the overlapping sheet edges 13*a*, 13*b* and the image sensor axes 16*a*, 16*b*, and 16*c*. For the sake of illustration, only the first two image sensors 15*a*, 15*b* and their related components are shown in FIG. 2. During an initial calibration step, the image sensors 15*a*, 15*b* are uncovered and exposed to ambient light to deliver to respective calibration storage 21*a*, 21*b* measured values of the ambient light for each of the light sensing elements in their respective sensor arrays. After the calibration step, the sheet 12 is placed on the support 10 and positioned so that the image sensors 15*a*, 15*b* are partially covered, as shown in FIG. 1. Then during a position checking step, light intensity values generated by the light sensing elements of the image sensors 15*a*, 15*b* are fed to temporary scanning storage 22*b*. Subsequently, the values are compared with the respective corresponding values in the calibration storage 21*a*, 21*b* by respective comparators 23*a*, 23*b*. The comparators, for example, calculate the difference between the respective measured values of light intensity stored in the calibration storage 21*a*, 21*b* with respective corresponding values stored in the scanning storage 22*a*, 22*b* to generate corresponding difference values. The difference values corresponding to the uncovered light sensing elements, for example, would all be approximately zero, regardless of any positional variation in ambient illumination. Thus the difference values generated by the comparators 23*a*, 23*b* are indictative of whether their respective corresponding sensing elements are covered by the sheet relatively independent of the magnitude of the response of the individual light sensing elements. In other words, by computing difference values, any variation in value due to uneven response of the light sensing elements to ambient illumination is suppressed.

The difference values are then fed to a position calculator 24 which detects the points of intersection of the covering edge 13 with the image sensor axes by analysis of the variations in the difference values corresponding to different light sensing elements. In a particular embodiment, the position calculator 24 has means for computing the gradient of the difference values for adjacent image points and for detecting maxima in the magnitude of the gradient to indicate the points of intersection.

Once the points of intersection or offset values are determined, the transformation constants are calculated by the position calculator 24. The transformation constants are used by the position calculator 24 to transform predetermined sheet coordinates (x',y') of the test strips 17 to plotter coordinates (x,y) for driving the X-Y position mechanism 25. The position calculator 24 may also be part of the same computer which receives data from the densitmeter 18 having been digitized by an analog-to-digital converter 26. The ink density data is converted into ink density values which are transmitted to the ink control components of the printing machine (not shown) in the usual fashion.

The predetermined sheet coordinates (x',y') may be entered into the memory of the position calculator 24 in a number ways. The coordinates may be entered directly from a keyboard 27 or magnetic disc or tape 28. Alternatively, the test sheet 12 having an arbitrary orientation on the support 10 may be scanned manually and the plotter coordinates (x,y) entered into the position calculator 24. The position calculator applies an inverse coordinate transformation so that the sheet coordinates (x',y') are stored. The test sheet is scanned manually by operator control of cursor push bottons 29 which move the head 19 of the X-Y positioning mechanism 25 to the location of the test strip 17. After the operator sights a test strip 17, the operator activites an enter push-button 29′ so that the position calculator knows that the plotter coordinates of the test strip are specified by current coordinates of the X-Y positioning mechanism 25.

Figure 3:
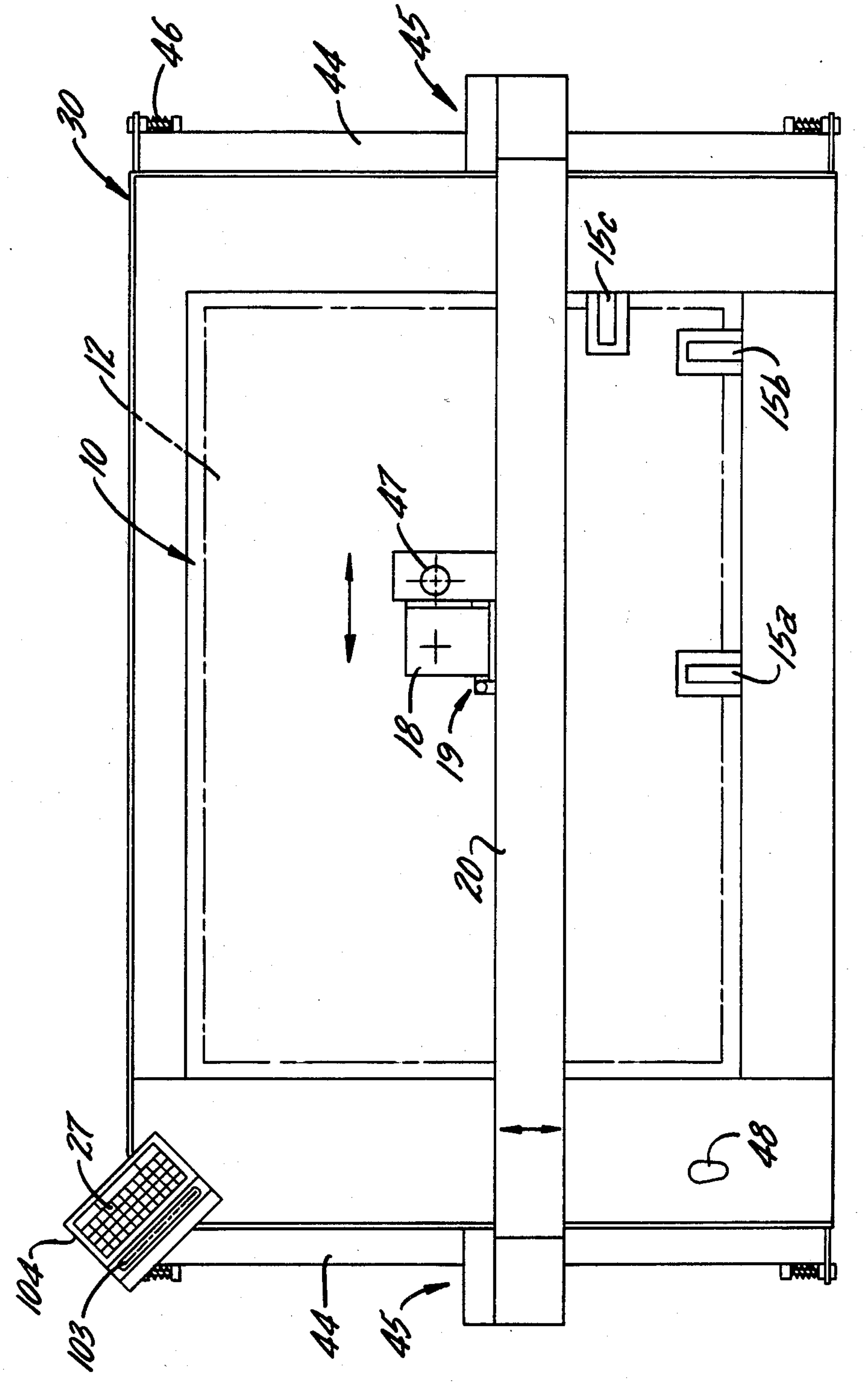
FIG. 3 is a plan view of the first embodiment of the invention using two linear sensor arrays to determine the position of a front edge of the sheet and one linear sensor array to determine the position of a side edge of the sheet.

Turning now to FIG. 3 there is shown a plan view of a first specific embodiment of the invention. The sheet support 10 is a delimited area of a coordinate measuring table 30. The cross bar 20 is mounted on guide rails 44 provided on the two narrow sides of the table 30. The cross bar 20 is driven in the longitudinal direction by stepper motors 45 over the sheet support 10 within limits set by stops 46. An optical sight 47 is mounted to the densitometer 18 and the center position of the sight 47 is displaced by a fixed distance from the center position or focus of the desitometer 18 so that the plotter coordinates of a sighted test strip are determined precisely with respect to the densitometer. The current plotter coordinates (x,y) in other words, are the coordinates of the focus of the densitometer, and the coordinates of a sighted test strip are displaced by the predetermined displacement from the current plotter coordinate when the test strip is sighted. The densitometer 18 may be driven to a calibrating element 48 located on the table 30 outside the region of the sheet support 10 and providing a calibrated level of illumination.

Figure 4:
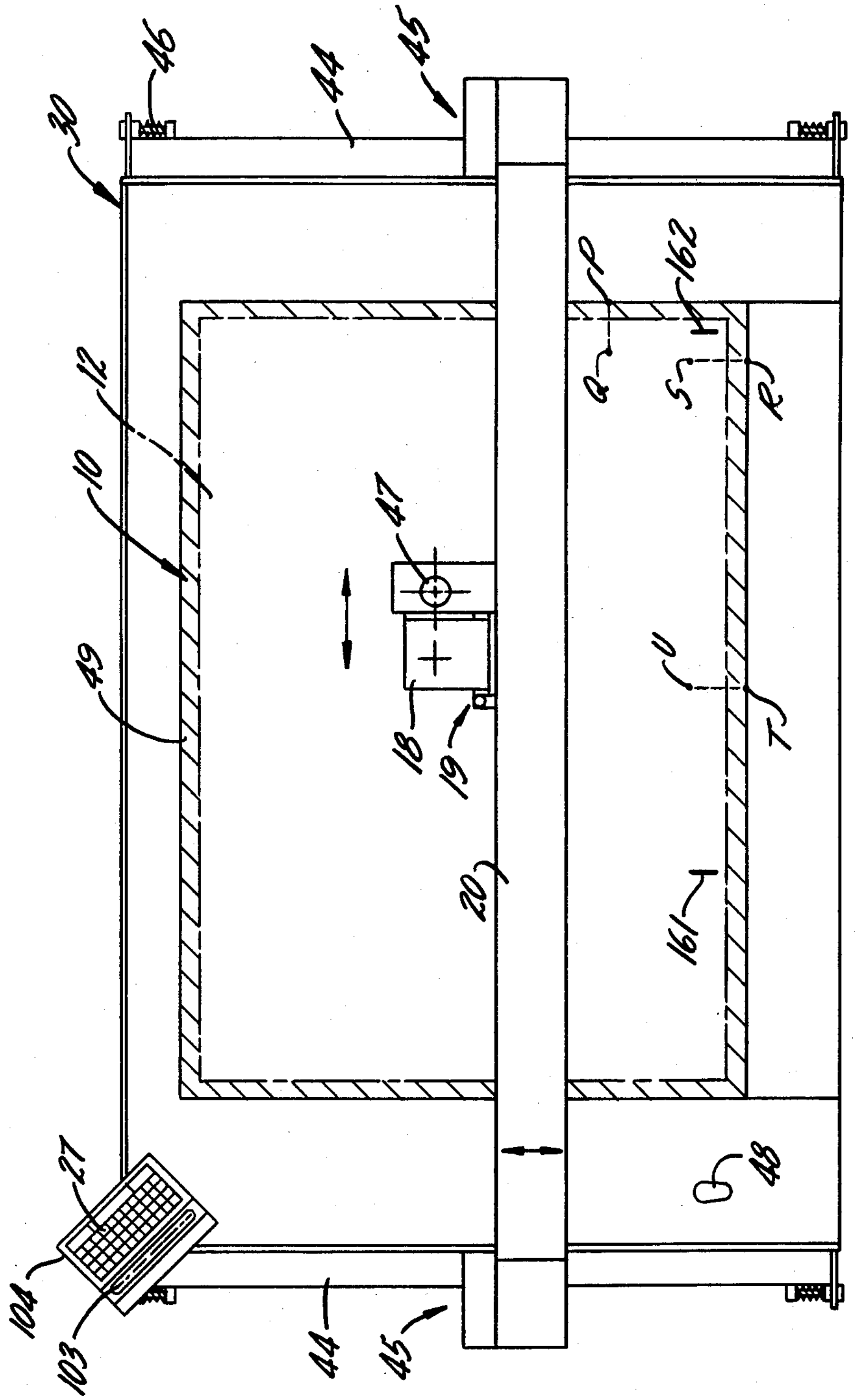
FIG. 4 is a plan view of a second embodiment of the invention using the densitometer itself to determine the position and orientation of the sheet on the support table.

The first embodiment of FIG. 3 uses three linear sensor arrays 15*a*, 15*b*, 15*c* embedded in the sheet support 10 to determine the offset values for the sheet 12. An alternative second embodiment of the invention is shown in FIG. 4. Instead of using sensor arrays, the embodiment of FIG. 4 uses the densitometer 18 itself for sensing the position and orientation of the test sheet 12 on the support 10. The sheet support 10 is provided with a dark border area 49 to provide high contrast with respect to the sheet. The densitometer 18 is driven across segments PQ, RS, and TU, respectively, to obtain data for calculating the offsets EC, EB, and EA. The densitometer 18 may also be driven to other portions of the border 49 to determine the size of the sheet 12.

Figure 5:
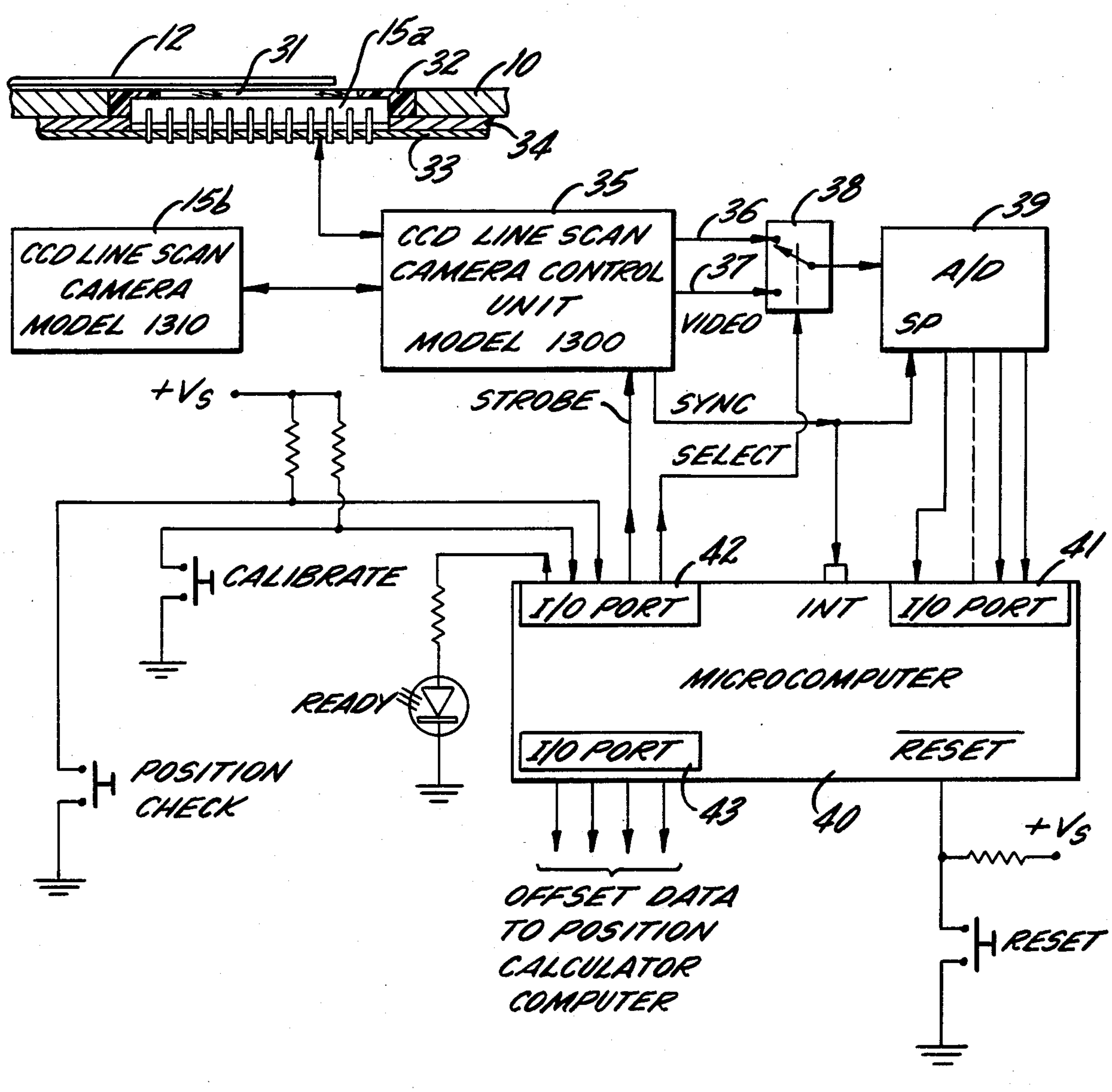
FIG. 5 is an electronic schematic diagram for the interface components which generate offset position data in response to signals from linear sensor arrays which sense the position of an edge of the sheet.
Figure 6:
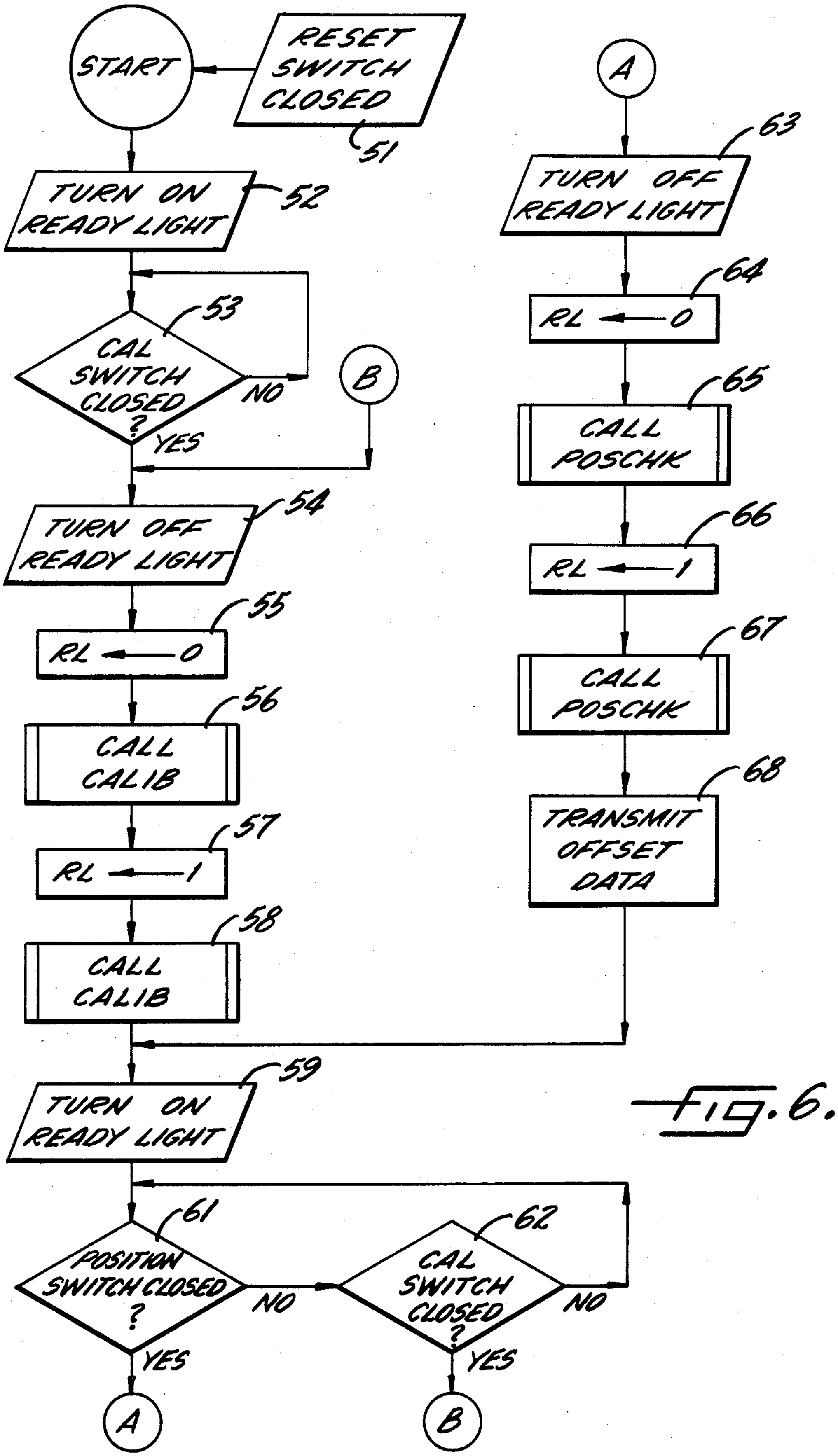
FIG. 6 is a flowchart of an executive procedure for the microcomputer in FIG. 5.

A particular embodiment for the edge-detecting electronics of FIG. 2 is shown in FIG. 5. This electronics is needed for the first embodiment of FIG. 3 but not the second embodiment of FIG. 4. The second embodiment of FIG. 4 uses digital signal processing carried out by the position calculator and memory 24, as further described below in conjunction with FIGS. 11 and 12. The electronics in FIG. 5 determines the sheet position offsets EA, EB in terms of the linear arrays 15*a*, 15*b* at the sheet edge 13*a*. The offsets EA, EB are sent to the position calculator 24, which is presumed to be a numerical computer having substantial arithmetic capabilities.

In order that the surface of the support 10 is perfectly flat to receive the sheet 12, the top surfaces of the optical windows 31 of the image sensors 15*a*, 15*b* are mounted flush with the surface of the support 10. The integrated circuit 15*a*, for example, is surrounded by epoxy 32 or a plastic bezel to fill the gap between the integrated circuit 15*a* and the support 10. The integrated circuit 15*a* is further mounted on a printed circuit board 33 that is firmly attached to the support 10 via a spacer 34. Suitable image sensors 15*a*, 15*b* are CCD line scan cameras model 1310 manufactured by Fairchild Corporation. The image sensing elements or cells in the integrated circuits 15*a*, 15*b* are scanned by a line scan camera control unit 35, model 1300 by Fairchild Corporation. In response to a strobe signal, the camera control unit 35 sequentially scans the image sensing elements to generate multiplexed video signals, the scanning being synchronous with a periodic signal SYNC available from the line scan camera control unit 35. Although a separate line scan camera control unit could be used with each image sensor 15*a*, 15*b*, electronic circuitry can be saved by paralleling the control inputs to the image sensors 15*a*, 15*b* and de-multiplexing the two video outputs on lines 36, 37 using a multiplexer or analog switch 38.

The video signals are analog and are converted to measured values or samples coincident with the synchronization signal SYNC using an analog-to-digital converter A/D 39. Thus, there is a correspondence between samples and image sensing elements, but there need not be a strict one-to-one correspondence. The A/D converter 39 serves as a means for converting the electrical video signals to measured values, the measured values being representative of and corresponding to the electrical signals generated by the respective light sensing elements.

These measured digital values are read by a microcomputer 40 on its I/O port 41, in response to the synchronization signal SYNC on its interrupt input INT. The microprocessor 40 also receives a CALIBRATE switch signal and a POSITION CHECK switch signal, and outputs a READY signal, the STROBE signal to the camera control unit 35, and a SELECT signal to the multiplexer 38 via the I/O port 42.

In order for the microcomputer to determine the offsets EA, EB of the sheet 12, the microcomputer 40 executes a procedure or series of instructions summarized by the flow-charts in FIGS. 6–10. The microcomputer 40 starts executing an executive procedure shown in FIG. 6 whenever the RESET switch of FIG. 3 is closed, as indicated in step 51 of FIG. 4. The microcomputer responds by turning on the READY light as shown in step 52. If the CALIBRATE push button is closed as tested in step 53, then the READY light is turned off in step 54, the left image sensor 15*a* is selected by setting the RL flag to 0 in step 55, and calibration values for the left image sensor are determined by the calibration subroutine in step 56. The calibration values for the right image sensor 15*b* are also measured by setting the RL flag to 1 in step 57 and again calling the calibration subroutine in step 58. In practice, this calibration sequence is initiated by the operator pushing the CALIBRATE switch before a sheet 12 is placed on the support 10. When the calibration is finished, the microcomputer turns the READY light back on in step 59 and waits for a new command by testing whether the POSITION switch is closed in step 61 and also testing whether the CALIBRATE switch is closed in step 62. If step 62 indicates that the calibration subroutine must be repeated, the execution jumps back to step 54 via the on-page connector B. If the POSITION switch is closed as detected in step 61, the execution jumps via the on-page connector A to step 63 to turn off the READY light and then to perform the position checking and servo driving procedures. Thus, in step 64 the image sensor flag RL is set to 0 to select the left image sensor 15*a* and the coordinates of the intersection of the overlapping edge 13 of the sheet with the axis of the image sensor 15*a* are determined by the position checking subroutine POSCHK in step 65. Similarly, the point of intersection for the right image sensor 15*b* is detected by the microprocessor performing steps 66 and 67. In step 68 the points of intersection or offset data are transmitted to the position calculator 24 (FIG. 2). Finally, the READY light is turned on in step 59 to signal to the operator that another positioning or calibration operation may be performed.

Figure 7:
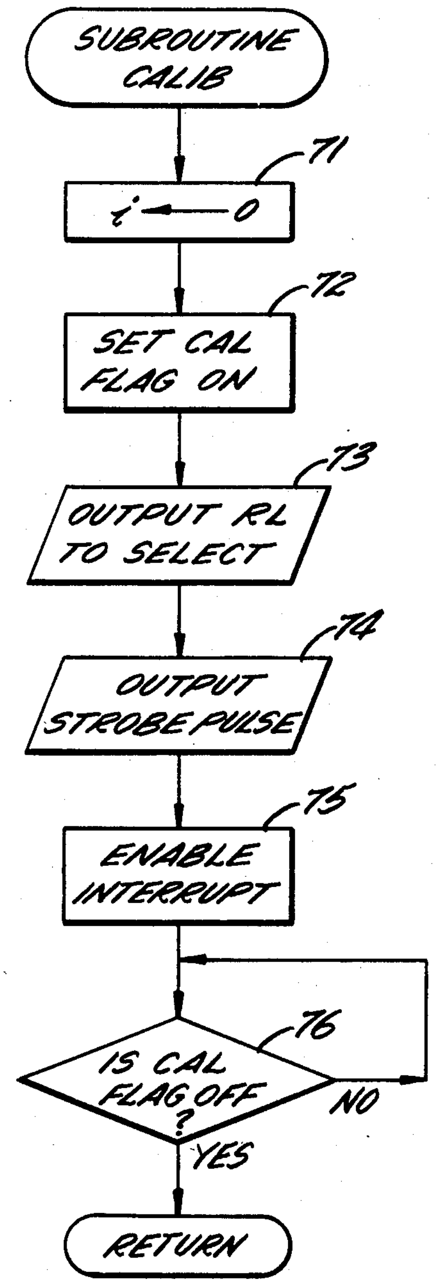
FIG. 7 is a flowchart for a calibration subroutine executed by the microcomputer in FIG. 5 to store calibration values.

The calibration subroutine CALIB which receives and stores measured values from the image sensors when the sheet is not placed on the support, is shown in FIG. 7. The actual calibration values are stored in a two-dimensional array C(i,RL) in the random access memory, or RAM of the microcomputer 40. In the first step 71 of the calibration subroutine, the index i is set to 0 so that the measured values will be stored at the beginning of the array C(i,RL). Then in step 72 the flag CAL is set on. The flag CAL is used to handshake with the interrupt routine so that the calibration subroutine CALIB knows when the interrupt routine has completed its requested function, as will be described later in conjunction with FIG. 9. Then in step 73 the image sensor selecting flag RL is outputed via port 42 to the SELECT line of the multiplexer 38 to select a particular one of the image sensors 15*a,* 15*b*. Once a particular image sensor is selected, a pulse is outputed on the STROBE line in step 74 so that the camera control unit 35 will dump the electrical signals generated by the light sensing elements of the selected image sensor and will generate the signal SYNC synchronized to the dumping of the individual light sensing elements onto the video lines 36 and 37 in FIG. 5. Then the interrupt routine is enabled in step 75 so that it may read in the measured values provided by the analog to digital converter A/D 39. The CAL flag is tested in step 76 to determine whether the interrupt routine is finished and has set the CAL flag off. If the CAL flag is off, the calibration subroutine is finished and execution returns to the calling executive program in FIG. 6.

Figure 8:
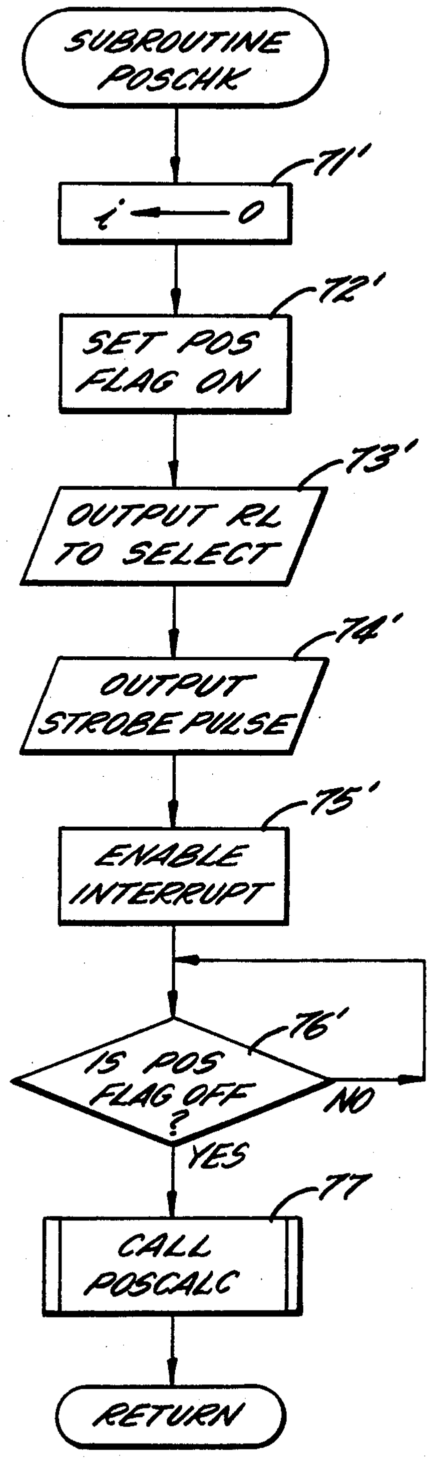
FIG. 8 is a flowchart of a position checking subroutine for temporarily storing scanned values and passing them to a comparing and position calculating subroutine.

The position checking subroutine POSCHK is shown in FIG. 8. Steps 71'-76' perform operations similar to steps 71-76 in the calibration subroutine CALIB of FIG. 7, except for the fact that the POS flag is set on in step 72' so that the interrupt routine accepts the measured values from the A/D converter 39 as position check values rather than calibration values. By the time step 77 is reached, the microcomputer RAM memory has calibration values stored in the array C(i,RL) and the position check values stored in the array S(i) so that position calculations may be performed in step 77.

Figure 9:
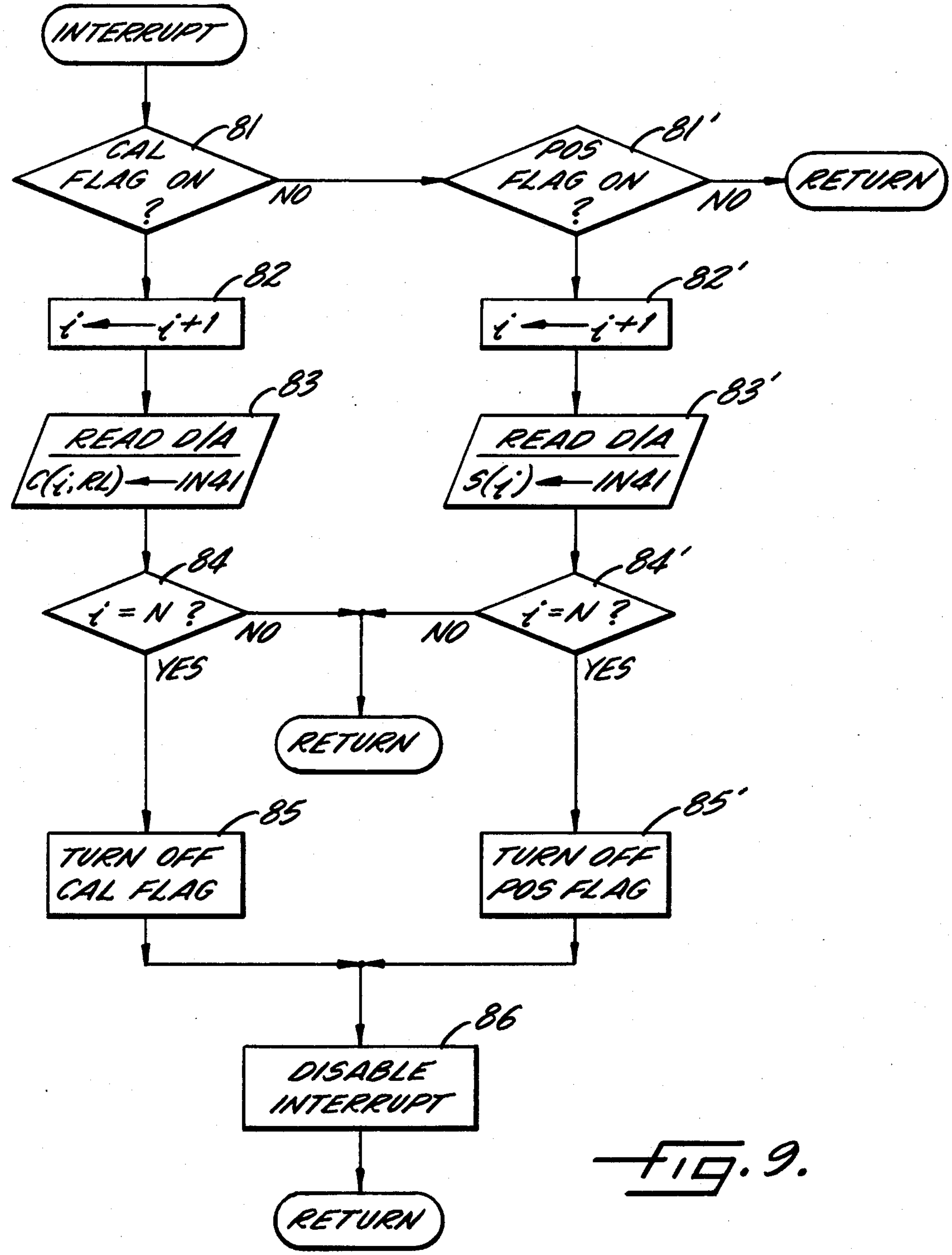
FIG. 9 is a flowchart of an interrupt routine executed by the microcomputer in FIG. 3 to input and store the calibration and scanned values.

The actual reading in of measured values on the I/O port 41 is performed by an interrupt routine shown in FIG. 9. In the first step 81 the calibration flag CAL is tested and if it is on then the light sensing element pointer i or array index is incremented in step 82. Then the I/O port 41 is read in step 83 and placed in the appropriate calibration array element C(i,RL). In step 84, the index i is compared to the number of light sensing elements N and if the index i is not equal to N, the interrupt routine is finished and execution returns to the foreground routines. But if the index i is equal to N, then all of the light sensing elements have been dumped and their light intensity values measured so that the calibration flag CAL is turned off in step 85 and the interrupt disabled in step 86 to signal to the foreground routines that all of the calibration values have been obtained.

If the calibration flag is off in step 81, then the interrupt routine tests whether the position flag is on in step 81'. If it is, then the position values are read into the position array S(i) in a similar manner as were the calibration values read into the calibration array C(i,RL). Thus the operations performed in steps 81'-85' are analogous to the calibration steps 81-85.

Figure 10:
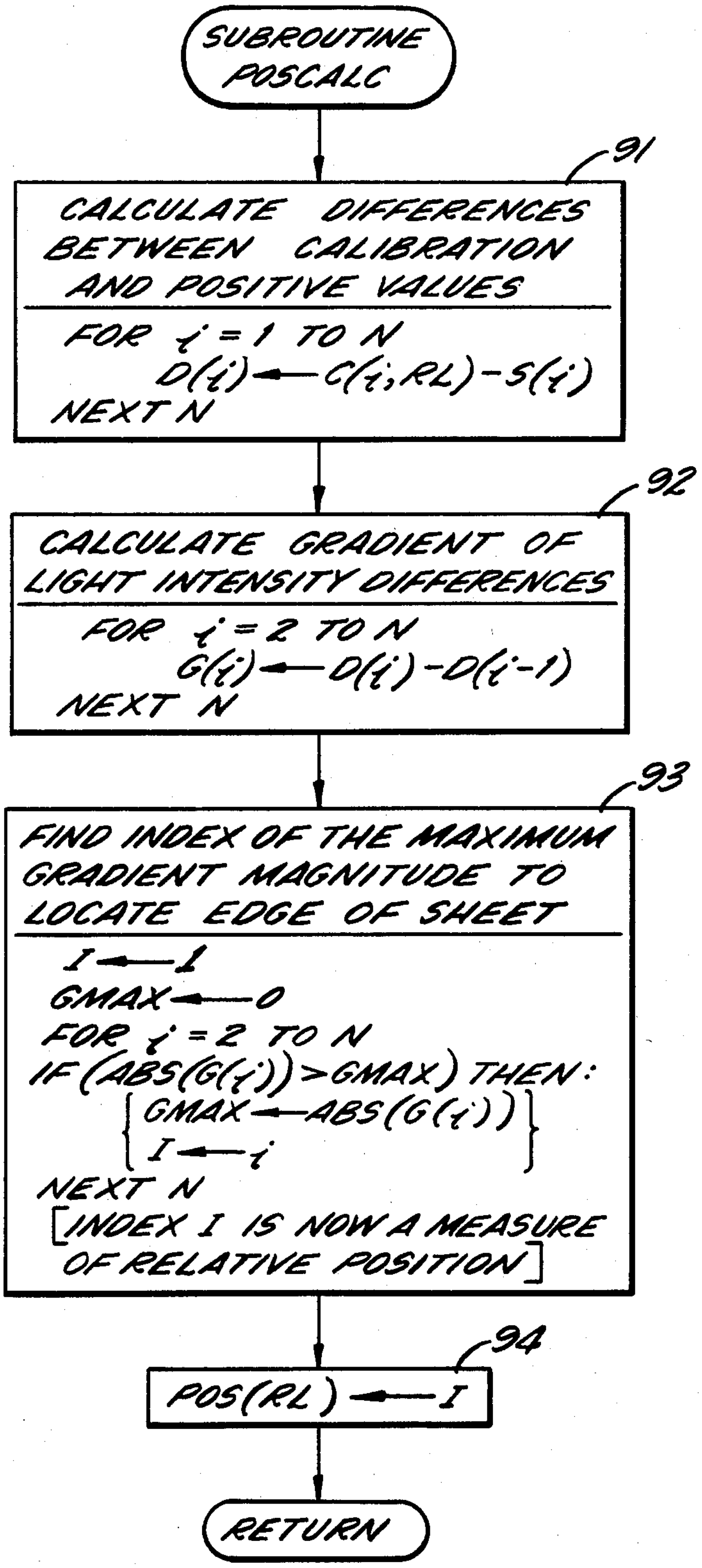
FIG. 10 is a flowchart of a comparator and position calculating subroutine executed by the microprocessor in FIG. 3 to calculate the coordinates of the points of intersection of the sheet edges and the axes of the image sensors.

The position calculating subroutine POSCALC is shown in FIG. 10. In step 91, corresponding to the comparators 23*a,* 23*b* of FIG. 2, the differences between the respective corresponding calibration and scanned position values are calculated. Then in step 92 the variation or gradient of light intensity differences is calculated. In step 93, the gradient is used to determine the location of the edge of the sheet by finding the maximum gradient GMAX and associating its index I with the position of the overlapping edge 13 of the sheet. In other words, the particular value I of the index i for the maximum gradient magnitude GMAX is a measure of position, the distance unit being directly proportional to the separation between ajacent CCD cells or light sensing elements. (The proportionality depends on the ratio of the cell dumping rate to the A/D sampling rate.) This particular value I is saved in step 94. The absolute position EA, EB of the point of intersection for each respective image sensor 15*a,* 15*b* is calculated by the position calculator 24 (FIG. 2) by multiplying the particular index I by the effective cell spacing and subtracting an offset due to the positioning of the image sensors 15*a,* 15*b* with respect to the sheet support 10.

As shown and described, the calibration C(i,RL) and position check or scanned values S(i) are determined after one STROBE pulse to the CCD line scan camera circuits 35. Alternatively, as will become evident to persons skilled in the art, several frames of values could be averaged or integrated in the calibration and scanning storage by adding respective corresponding values into the arrays C(i,RL) and S(i,RL) after several individual STROBE pulses. This represents a tradeoff of additional scanning time and storage space for increased signal-to-noise ratio and resolution. It should also be noted that an entire array S(i) instead of a single temporary scanning storage location S has been used in the embodiment shown to simplify programming requirements. Alternatively, all of the calculations in the subroutine POSCALC of FIG. 10 could operate on the single temporary storage location S in serial fashion, instead of using arrays.

Figure 11:
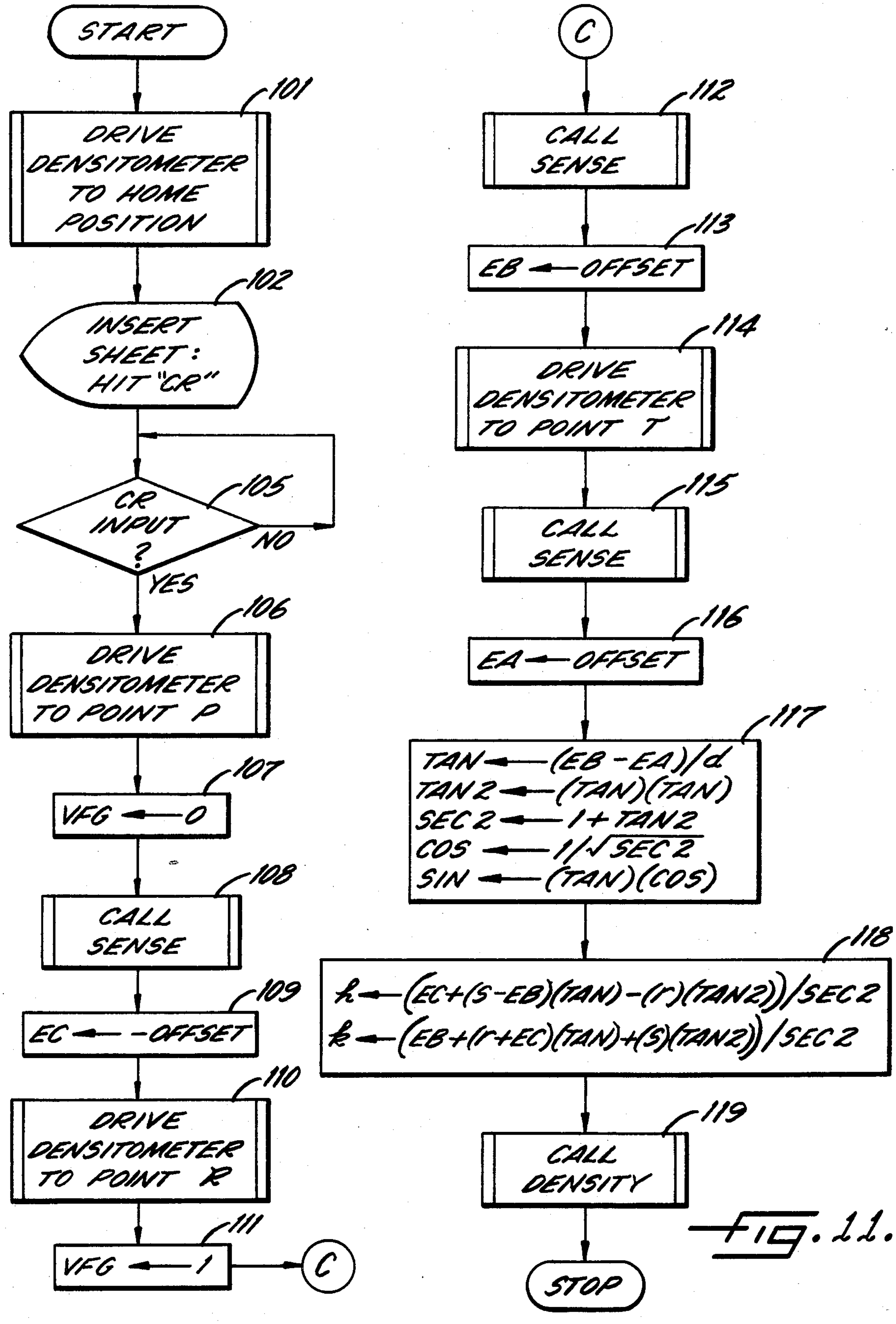
FIG. 11 is a flowchart of an executive program executed by the position calculator or computer to drive the densitometer to determine the orientation and position of the sheet and to scan the color measurement strips printed on the sheet.

The electronic circuitry and associated software for determining offset values EA, EB, and EC from electrical signals from the sensors 15*a,* 15*b,* 15*c,* used in the embodiment of FIG. 3 have been described in detail. In the embodiment of FIG. 4, the sensors 15*a,* 15*b,* 15*c* are not used, and instead the densitometer 18 is scanned across segments PQ, RS, and TU to determine the offset values. The scanning of the segments PQ, RS, TU is performed by the executive program for the numerical computer or position calculator 24 in FIG. 2. An exemplary executive program is shown in FIG. 11. In the first step 101 the densitometer 18 is driven to a home position corresponding to the lower right hand corner of the sheet support 10 in order to clear the sheet support for receiving the test sheet 12. In step 102, the operator is told to insert a sheet on the sheet support 10 and then to hit a carriage return on the keyboard 27. A suitable message is provided on a display 103 which is part of a terminal 104 including the keyboard 27 (FIG. 3 and FIG. 4). After the carriage return is received as tested in step 105, the executive program obtains the offsets EA, EB, and EC of the sheet edges 13*a* and 13*b* (FIG. 1). In the embodiment of FIG. 3 these offsets are received from one or more microcomputers 40 (FIG. 5) associated with the linear sensor arrays 15*a,* 15*b,* and 15*c*. In the embodiment of FIG. 4, the offsets EA, EB, and EC are obtained by executing a series of software steps, starting with step 106 and ending with step 116 in FIG. 11.

In step 106, the densitometer 18 is driven to point P (FIG. 4) in order to start the scanning of the segment PQ. The actual scanning is performed by a subroutine called SENSE shown in FIG. 12. The subroutine SENSE may scan in either a longitudinal or traverse direction. Therefore, in step 107, a flag VFG is set to zero to indicate that scanning is to proceed in a traverse direction. In step 108, the subroutine SENSE is called to generate an offset value. The subroutine SENSE starts scanning in the dark border area 49 and detects an edge 13*a*, 13*b* of the sheet 12 when the light intensity received by the densitometer 18 suddenly increases. In step 109 the offset generated by the SENSE subroutine has its sign inverted to generate the offset EC since scanning of the segment PQ occurs in the negative X axis direction. The scanning of the segment RS proceeds in a similar manner. In step 110 the densitometer is driven to point R and in step 111 the vertical flag VFG is set to one. In step 112, the subroutine SENSE is called and in step 113 the offset EB is set equal to the offset generated by the SENSE subroutine. Similarly in step 114 the densitometer is driven to point T and the subroutine SENSE is called in step 115 to scan the segment PQ. In step 116 the offset EA is set equal to the offset generated by the SENSE subroutine in step 115.

Now that the offsets have been determined by the sensors 15*a*, 15*b*, 15*c* or by scanning of the densitometer 18, the trigonometric functions of the angle $\phi$ of the sheet 12 with respect to the support 10 are calculated in step 117. It is not necessary to calculate explicitly the angle $\phi$ since all of the trigonometric functions may be determined from the tangent of the angle $\phi$. In step 118, the transformation constants (h,k) are calculated from the trigonometric functions of the angle $\phi$ and the offsets EC and EB. The transformation constants (h,k) and the sine and cosine of the angle $\phi$ are then used in transforming sheet coordinates of ink density or color measurement test strips 17 in order to permit precise scanning of the test strips by the densitometer. The coordinate transformation and the actual scanning of the test strips is performed by a subroutine DENSITY which is called in step 119. The executive program of FIG. 11 is now finished for the particular test sheet 12. The executive program of FIG. 11 may be reexcuted for any number of additional test sheets 12.

Turning now to FIG. 12 there is shown a flow chart of the subroutine SENSE which causes the densitometer 18 to scan the individual segments PQ, RS, or TU and analyzes the densitometer data to determine an offset value for the respective segment. In the first step 121, a number of variables are set to zero. These variables include an index, a memory location GMAX for determining the maximum gradient of the densitometer signal, and a variable I to receive the value of the index corresponding to the maximum gradient in the densitometer signal. In step 122 an initial densitometer reading is obtained and stored in a variable DOLD. In step 123 the index is incremented in order to start a repetitive step along the respective segment PQ, RS or TU. In step 124 the direction flag VFG is compared to zero to determine whether a longitudinal or traverse segment is being scanned. If the flag VFG is equal to zero, then a traverse segment such as segment PQ is being scanned so that in step 125 the X stepper motor is pulsed in reverse. If the flag VFG is not equal to zero, then a longitudinal segment RS or TU is being scanned so that in step 126 the Y stepper motor is pulsed forward. After either the X or Y stepper motor has driven the densitometer 18 to its new location, the densitometer signal is read in step 127 and the densitometer value is stored in a memory location DNEW. In step 128, the gradient G of the densitometer value is computed as the difference between the new and old densitometer reading. After the gradient G is calculated, the new densitometer value is transferred to the memory location DOLD in anticipitation of the fact that the current densitometer value will become the old densitometer value for the next iterative cycle.

The maximum of the gradient G is determined on a continous basis as the densitometer 18 is scanning the respective segment PQ, RS, or TU by continously updating the memory location GMAX to hold the largest gradient G having been calculated in step 128. This updating is performed in step 129 by determining whether the current gradient G is greater than the stored maximum GMAX and, if the current gradient G is greater than the stored maximum GMAX by storing in step 130 the current gradient G in the memory location GMAX. In step 130 the pointer I receives the current value of the index in order to specify the particular step or point along the respective segment PQ, RS, or TU associated with the value stored in memory location GMAX. In other words, when scanning of the respective segment PQ, RS, or TU is complete, the pointer I will be a relative indication of the location of the respective edge 13*a*, 13*b* of the test sheet 12.

In step 131 the current value of the index is compared to a maximum value N denoting the number of steps of the stepper motor to traverse the length of the respective segment PQ, RS, or TU. If the current value of the index is less than this maximum N another iterative cycle is executed starting with step 123. If, however, the current value of the index is greater or equal to the maximum index N, then the iterative process is finished and in step 132 the offset is calculated by multiplying the index I pointing to the maximum gradient by the step size of the stepper motors and by subtracting a predetermined center offset of half the length of the segments.

Shown in FIG. 13 is a flow chart of the DENSITY subroutine called in step 119 of FIG. 11 to scan the individual test strips 17. In the first step 141, a number of input options are displayed to the operator on the display 103 of the terminal 104 (FIGS. 3 and 4). These options include a storage option wherein the coodinates of the test strips are obtained from non-volatile memory, a tape option wherein the test strip coordinates are obtained from a magnetic tape or disk 28 (FIG. 2), a keyboard option wherein the operator may directly enter test strip coordinates, and a sight option wherein the operator may measure the coordinates of test strips 17 on the test sheet 12 using the sight 47 (FIGS. 2 and 3). In step 142 the operator's selection is received from the keyboard 47.

In step 143 the sight option is sensed and if the sight option has been selected the sighted plotter coordinates (x,y) are received in step 144. The sighted coordinates are not the coordinates of the sighted test strip, but rather they are displaced in the X direction by a predetermined displacement D representing the distance between the cross hairs of the sight 47 and the focus of the densitometer 18. In step 145 the plotter coordinates of the sighted test strip 17 are calculated by adding the distance D to the entered x coordinate. In step 145, the plotter coordinates (x+D,y) are also transformed to paper coordinates (x',y') by using an inverse coordinate transformation. The paper coordinates (x',y') are then stored in non-volatile memory in step 146 for future use. The sight option, in other words, is advantageously used to determine the paper coordinates of the test strips 17 for the first of many similar test sheets 12 for a production run. The paper coordinates for the successive sheets are later obtained from non-volatile memory using the storage option. If the keyboard option is selected by the operator as determined in step 147, the paper coordinates (x',y') are received in step 148 from the operator through the keyboard 27. The paper coordinates (x',y') are also stored in step 147 in the non-volatile memory for future use. Similarly, if the tape option is selected as sensed in step 149, the paper coordinates (x',y') are read in step 150 by the tape reader 28 (FIG. 2) and the paper coordinates are also stored in step 146 in the non-volatile memory for future use. In step 151, an end of input condition is tested and if there are more test strip coordinates to be entered, execution jumps back to step 143. Otherwise, execution jumps to step 152 to get the coordinates of the first test strip 17 from the non-volatile memory.

In accordance with one important aspect of the invention, in step 153 the paper coordinates (x',y') obtained from the memory are transformed using the coordinate transformation and the transformation constants (h,k) and the trigonometric functions of the angle $\phi$ which have been automatically determined for transforming the paper coordinates to plotter coordinates. Thus, in step 154 the densitometer is driven to the plotter coordinates (x,y) with the assurance that the densitometer 18 will be properly aligned over the respective test strip 17 regardless of the location and orientation of the sheet 12 on the sheet support 10. In step 155, the test strip 17 is scanned by the densitometer 18. This scanning occurs, for example, in the X' direction of the coordinate system referenced to the sheet 12 or, in other words, at the angle $\phi$ with respect to the plotter coordinate axis. As the test strip 17 is scanned, the ink density values are read from the analog-to-digital converter 26 (FIG. 2) and the values are then transmitted to ink density control components of the printing machine (not shown). This completes the scanning of a particular one of the color measurement or ink density strips 17. In step 156 the presence of more coordinates for test strips is tested, and if there are more coordinates then execution jumps back to step 152. Otherwise, the subroutine DENSITY is finished since all of the test strips 17 for the test sheet 12 have been scanned by the densitometer 18.

An additional feature of the invention is automatic correction for sheet shrinkage. As shown in FIG. 4, shrinkage detection marks 161, 162 are printed on the sheet 12 and their positions with respect to the coordinate measurement table 30 may be sensed by the densitometer 18 using the subroutine SENSE in FIG. 12. The sensing of the marks 161, 162 is analagous to the sensing of the edge 13*b* by driving the densitometer along segment PQ. The densitometer 18, for example, is first driven just to the right of the mark 162 and is focused initially on the sheet 12. The subroutine SENSE is called with the flag VFG set equal to zero so that the densitometer 18 is driven in the minus X direction across the mark 162. The subroutine SENSE returns the relative position of the dark-to-light edge of the mark 162. Then the densitometer 18 is driven along the X' direction to the mark 161 and the coordinates of the mark 161 with respect to the densitometer table 30 are similarly determined. The distance between the marks 161 and 162 is calculated from the coordinates of the marks and the distance is a measure of the shrinkage of the sheet 12. A shrinkage factor S is calculated as the distance between the two marks 161, 162 on the printed sheet divided by the known distance between the corresponding marks on the associated printing plate. To compensate for sheet shrinkage, the shrinkage factors are used as an adjustment factor upon sheet coordinates (x',y') determined from the engraving on the printing plate.

Turning now to FIG. 13, the subroutine DENSITY includes the necessary steps to correct for sheet shrinkage. If the actual positions of the color measurement strips are sighted, then there is no need to compensate for shrinkage since the actual positions of the test strips have already been affected by sheet shrinkage. Hence, in step 163 the shrinkage factor S is set to one. If, however, option 4 was not selected, then in step 164 the selection of a shrinkage option by the operator is sensed. If the operator has not specified a shrinkage correction, then in step 165 the shrinkage factor S is set to one. Otherwise, in step 166, the distance T between the marks 161, 162 is measured in the manner described above. Then, in step 167 the shrinkage factor S is calculated by dividing the measured distance T by the known distance $T_k$ between the corresponding marks on the associated plate. The shrinkage factor S is used in the coordinate transformation step 153 as an adjustment factor to the sheet coordinates (x',y').

In view of the above, an apparatus for scanning color measurement strips has been described which reduces the time, labor and error associated with the setting up and maintenance of the ink density adjustments for a printing operation. The test sheets need not be precisely aligned on the densitometer table since the position and orientation of the sheets are sensed and the coordinates of the test strips are adjusted accordingly. Moreover, the coordinates of the test strips are scaled to compensate for shrinkage of the test sheets.

What is claimed is:

1. An apparatus having an optical densitometer for evaluating at least one ink density test strip printed at a predetermined position on a sheet lying on a coordinate measuring table, the surface of the coordinate measuring table having regions of high optical contrast with respect to the printed sheet near edge portions of the printed sheet, said optical densitometer providing an indication of light intensity received from a focal area, said apparatus comprising:

(a) a digitally-driven X,Y positioning mechanism mounted to the coordinate table for positioning the optical densitometer to focus on the printed sheet at commanded coordinates (x,y) with respect to the coordinate table, and (b) numerical computing means for generating said commanded coordinates, said numerical computing means having means for obtaining numerical values of the light intensity indicated by said optical densitometer, and said numerical computing means having a memory storing a procedure which is executed by said numerical computing means for:

(1) automatically determining the position of the printed sheet with respect to the coordinate measuring table by scanning at least one edge portion of the printed sheet with the optical densitometer by commanding the digitally driven X,Y positioning mechanism to drive the optical densitometer along a predefined path including an edge portion of the printed sheet and the adjacent high contrast area on the surface of the coordinate measuring table, and determining the coordinates of the point of intersection of said path and the edge of said sheet in response to the numerical values of light intensity indicated by said densitometer, (2) obtaining and storing coordinates of the ink density test strip with respect to the printed sheet, (3) determining the position of the ink density test strip with respect to the coordinate measuring table in response to said stored coordinates of the ink density test strip with respect to the printed sheet and the determined position of the printed sheet with respect to the coordinate measuring table, and (4) scanning the optical densitometer over said determined position of the ink density test strip with respect to the coordinate measuring table to determine ink density values.

2. An apparatus having an optical densitometer for evaluating at least one ink density test strip printed at a predetermined position on a sheet lying on a coordinate measuring table, the surface of the coordinate measuring table having regions of high optical contrast with respect to the printed sheet near edge portions of the printed sheet, said optical densitometer providing an indication of light intensity received from a focal area, said apparatus comprising:

(a) a digitally-driven X,Y positioning mechanism mounted to the coordinate table for positioning the optical densitometer to focus on the printed sheet at commanded coordinates (x,y) with respect to the coordinate table, (b) a sight device mounted on said X,Y positioning mechanism, (c) means for an operator to position said sight device with respect to said ink density test strip by changing said commanded coordinates, and (d) numerical computing means for generating said commanded coordinates, said numerical computing means having means for obtaining numerical values of the light intensity indicated by said optical densitometer, and said numerical computing means having a memory storing a procedure which is executed by said numerical computing means for:

(1) automatically determining the position of the printed sheet with respect to the coordinate measuring table by scanning at least one edge portion of the printed sheet with the optical densitometer by commanding the digitally driven X,Y positioning mechanism to drive the optical densitometer along a predefined path including an edge portion of the printed sheet and the adjacent high contrast area on the surface of the coordinate measuring table, and determining the coordinates of the point of intersection of said path and the edge of said sheet in response to the numerical values of light intensity indicated by the densitometer, (2) obtaining the coordinates of the ink density test strip with respect to the printed sheet by computing them from said commanded coordinates when the operator has positioned said sight device with respect to said ink density test strip and from the automatically determined position of the printed sheet with respect to the coordinate measuring table, and storing the coordinates so obtained, (3) determining the position of the ink density test strip with respect to the coordinate measuring table in response to said stored coordinates of the ink density test strip with respect to the printed sheet and the determined position of the printed sheet with respect to the coordinate measuring table, and (4) scanning the optical densitometer over said determined position of the ink density test strip with respect to the coordinate measuring table to determine ink density values.

3. A method of using an apparatus having an optical densitometer for evaluating at least one ink density test strip printed at a predetermined position on a sheet lying on a coordinate measuring table, the surface of the coordinate measuring table having regions of high optical contrast with respect to the printed sheet near edge portions of the printed sheet, said optical densitometer providing an indication of light intensity received from a focal area, said apparatus comprising:

(a) a digitally-driven X,Y positioning mechanism mounted to the coordinate table for positioning the optical densitometer to focus on the printed sheet at commanded coordinates (x,y) with respect to the coordinate table, (b) a sight device mounted on said X,Y positioning mechanism, (c) means for an operator to position said sight device with respect to said ink density test strip by changing said commanded coordinates, and (d) numerical computing means for generating said commanded coordinates, said numerical computing means having means for obtaining numerical values of the light intensity indicated by said optical densitometer, and said numerical computing means having a memory storing a procedure which is executed by said numerical computing means for:

(1) automatically determining the position of the printed sheet with respect to the coordinate measuring table by scanning at least one edge portion of the printed sheet with the optical densitometer by commanding the digitally driven X,Y positioning mechanism to drive the optical densitometer along a predefined path including an edge portion of the printed sheet and the adjacent high contrast area on the surface of the coordinate measuring table, and determining the coordinates of the point of intersection of said path and the edge of said sheet in response to the numerical values of light intensity indicated by the densitometer, (2) obtaining the coordinates of the ink density test strip with respect to the printed sheet by computing them from said commanded coordinates when the operator has positioned said sight device with respect to said ink density test strip and from the automatically determined position of the printed sheet with respect to the coordinate measuring table, and storing the coordinates so obtained, (3) determining the position of the ink density test strip with respect to the coordinate measuring table in response to said stored coordinates of the ink density test strip with respect to the printed sheet and the determined position of the printed sheet with respect to the coordinate measuring table, and (4) scanning the optical densitometer over said determined position of the ink density test strip with respect to the coordinate measuring table to determine ink density values, said method comprising placing on said coordinate measuring table a first selected printed sheet having a first selected test strip printed thereon, operating said means for an operator to position said sight device so that said sight device is positioned with respect to said first selected test strip, operating said apparatus so that the position of said first selected test strip with respect to said coordinate measuring table is obtained and stored and said first selected test strip is scanned to determine corresponding ink density values, and thereafter successively placing on said coordinate measuring table other selected printed sheets similar to said first selected sheet and operating said apparatus without using said means for an operator to position said sight device to thereby automatically scan test strips on said other selected printed sheets and obtain corresponding ink density values regardless of the positions of said other test sheets with respect to said coordinate table.

* * * * *